(12) United States Patent
Taylor et al.

(10) Patent No.: US 11,230,562 B2
(45) Date of Patent: Jan. 25, 2022

(54) SYNTHESIS OF ZINC MOF MATERIALS

(71) Applicant: UTI Limited Partnership, Calgary (CA)

(72) Inventors: Jared M. Taylor, Calgary (CA); Roger K. Mah, Calgary (CA); George K. H. Shimizu, Calgary (CA)

(73) Assignee: UTI Limited Partnership, Calgary (CA)

( * ) Notice: Subject to any disclaimer, the term of this patent is extended or adjusted under 35 U.S.C. 154(b) by 0 days.

(21) Appl. No.: 17/050,008

(22) PCT Filed: Apr. 25, 2019

(86) PCT No.: PCT/CA2019/050530
§ 371 (c)(1),
(2) Date: Oct. 23, 2020

(87) PCT Pub. No.: WO2019/204934
PCT Pub. Date: Oct. 31, 2019

(65) Prior Publication Data
US 2021/0179638 A1     Jun. 17, 2021

Related U.S. Application Data

(60) Provisional application No. 62/662,661, filed on Apr. 25, 2018.

(51) Int. Cl.
| | | |
|---|---|---|
| *C07F 3/06* | (2006.01) |
| *B01J 20/22* | (2006.01) |
| *B01J 20/28* | (2006.01) |
| *B01J 20/30* | (2006.01) |

(52) U.S. Cl.
CPC ............. *C07F 3/06* (2013.01); *B01J 20/226* (2013.01); *B01J 20/2808* (2013.01); *B01J 20/28064* (2013.01); *B01J 20/3078* (2013.01); *B01J 20/3085* (2013.01)

(58) Field of Classification Search
CPC .. C07F 3/06; B01J 20/22; B01J 20/226; B01J 20/28064; B01J 20/2808; B01J 20/3078; B01J 20/3085; C30B 29/54
USPC ........................................................ 548/107
See application file for complete search history.

(56) References Cited

U.S. PATENT DOCUMENTS

| | | |
|---|---|---|
| 6,929,679 B2 | 8/2005 | Harth et al. |
| 7,662,746 B2 | 2/2010 | Yaghi et al. |
| 8,796,462 B2 | 8/2014 | Li et al. |
| 9,782,745 B2 | 10/2017 | Shimizu et al. |
| 2010/0132549 A1 | 6/2010 | Omary et al. |
| 2012/0118153 A1 | 5/2012 | Omary et al. |
| 2012/0186449 A1 | 7/2012 | Yaghi et al. |
| 2012/0259117 A1 | 10/2012 | Yaghi et al. |
| 2013/0012717 A1 | 1/2013 | Trukhan et al. |
| 2015/0158012 A1 | 6/2015 | Vaidhyanathan et al. |

FOREIGN PATENT DOCUMENTS

| | | |
|---|---|---|
| CN | 1617761 A | 5/2005 |
| CN | 101151091 A | 3/2008 |
| CN | 102389686 A | 3/2012 |
| CN | 102574886 A | 7/2012 |
| WO | WO2006/110740 | 10/2006 |
| WO | WO2010/148374 | 12/2010 |
| WO | WO2012/100224 | 7/2012 |
| WO | WO2014/138878 | 9/2014 |

OTHER PUBLICATIONS

Erucar, et al. (2013) "High $CO_2$ Selectivity of an Amine-Functionalized Metal Organic Framework in Adsorption-Based and Membrane-Based Gas Separations," *Ind. Eng. Chem Res.*, 52(9), pp. 3462-3472.
Garcia-Couceiro, et al. (2006) "Rational Design of 2D Magnetic Metal-Organic Coordination Polymers Assembled from Oxalato and Dipyridyl Spacers," *Cryst. Growth Des.* 6(08), pp. 1839-1847.
Garcia-Couceiro, et al. (2009) "Structural and magnetic characterization of one-dimensional oxalato-bridged metal(II) complexes with 4-amino-3,5-bis(2-pyridyl)-1,2,4-triazole ligand: A supramolecular open-framework," Inorganica Chimica Acta, 362:4212-4218.
Garcia-Couceiro, et al. (2009) "Structural and magnetic characterization of onedimensional oxalato-bridged metal(II) complexes with 4-amino-3,5-bis(2-pyridyl)-1,2,4-triazole ligand: A supramolecular open-framework," Inorganica Chimica Acta, 362:4212-4218 Supporting Material.
Garcia-Teran, et al. (2004) "One-Dimensional Oxalato-Bridged Cu(II), Co(II), and Zn(II) Complexes with Purine and Adenine as Terminal Ligands," *Inorganic Chem.* 43(18), pp. 5761-5770.
Ghosh, et al. (2004) "Reactivity of Pyridine-2,4,6-tricarboxylic Acid toward Zn(II) Salts under Different Reaction Conditions," *Inorganic Chem.* 43(18), pp. 5495-5497.
Habib, et al. (2009) "Crystal Structure Solid-State Cross Polarization Magic Angle Spinning $^{13}C$ NMR Correlation in Luminescent d10 Metal-Organic Frameworks Constructed with the 1,2-Bis(1,2,4-triazol-4-yl)ethane Ligand." *Inorganic Chemistry*, 48(5), pp. 2166-2180.

(Continued)

*Primary Examiner* — Edward M Johnson
(74) *Attorney, Agent, or Firm* — Leydig, Voit & Mayer, Ltd.

(57) ABSTRACT

Method for making a Zn MOF of formula $Zn_2Ht_2CL$, where Ht is 1,2,4-triazolate or a combination of 1,2,4-triazolate and one or more other cycloazocarbyl compound, and CL is oxalate or a combination of oxalate and one or more chelating ligand other than oxalate. More specifically, the Zn MOF is $Zn_2Tz_2Ox$, where Tz is 1,2,4-triazolate and Ox is oxalate. The method includes reacting 2 molar equivalents of 1,2,4-triazole or the combination with cycloazocarbyl compound with 1 molar equivalent of oxalate or the combination with other chelating ligand and adding 2 molar equivalents of $Zn^{2+}$ to form the Zn MOF. The solvent used can be a lower alcohol or a miscible mixture of water and a lower alcohol. One or both reaction steps are conducted at a temperature less than or equal to 120° C. and can be conducted at room temperature and ambient pressure.

20 Claims, 4 Drawing Sheets

(56) References Cited

OTHER PUBLICATIONS

International Preliminary Report On Patentability (IPRP) and Written Opinion corresponding to International Application No. PCT/CA2019/050530, dated Oct. 27, 2020.

Li, et al. (2011) "Structure Modulation in Zn(II)-1,4-Bis(imidazol-1-yl)benzene Frameworks by Varying Dicarboxylate Anions," *Cryst. Growth Des.* (2012), 12(1), pp. 189-196.

Li, et al. (2013) "One-step fabrication of ZIF-8/polymer composite spheres by a phase inversion method for gas adsorption," *Colloid Polym. Sci.*, 291(11), pp. 2711-2717.

Lin, et al. (2008) "Pillaring Zn-triazolate layers with flexible aliphatic dicarboxylates into three-dimensional metal-organic frameworks," *Cryst. Growth Des.*, 8(10), 3673-3679.

Niu et al. (2011) "A Series of Two-Dimensional Co(II), Mn(II), and Ni(II) Coordination Polymers with Di- or Trinuclear Secondary Building Units Constructed by 1,1'-Biphenyl-3,3'-Dicarboxylic Acid: Synthesis, Structures, and Magnetic Properties," Cryst Growth Des., 11(7), pp. 2874-2888.

Park, et al. (2007) "Synthesis and Structural Determination of Four Novel Metal-Organic Frameworks in a Zn-3-Amino-1,2,4-Triazole System," *Cryst. Growth Des.*, 7(7), pp. 1343-1349.

Qian, et al. (2013) "One-step Preparation of Macroporous Polymer Particles with Multiple Interconnected Chambers: A Candidate for Trapping Biomacromolecules," Angew. Chem., 52(40), pp. 10625-10629.

Ren, et al. (2011) "Synthesis and characterization of two new triazolate-aliphatic dicarboxylate bridged Zn(II) coordination polymers based on 2D layer motifs with different crystal packing," *Inorg. Chim. Acta*, 373(1), pp. 79-84.

Rodriquez-Dieguez, et al. (2006) "[$Zn_n$(polyox)(pmtz)$_n$]: the first polyoxalate-containing coordination polymer from an unforeseen chemical rearrangement of 5-pyrimidyltetrazole under hydrothermal conditions," *Chem. Comm.* 39, pp. 4140-4142.

Su, et al. (2003) "Exceptionally Stable, Hollow Tubular Metal-Organic Architectures: Synthesis, Characterization, and Solid-State Transformation Study," J. Am. Chem. Soc., 126(11), 2004, pp. 3576-3586.

Thirugnanam (2013) "Effect of Polymers (PEG and PVP) on Sol-Gel Synthesis of Microsized Zinc Oxide," J. Nanomater., ID: 362175, 7 pages.

Tsue, et al. (2011) "Crystallographic analysis of $CO_2$ sorption state in seemingly nonporous molecular crystal of azacalix[4]arene tetramethyl ether exhibiting highly selective $CO_2$ uptake," *CrystEngComm*, 14, pp. 1021-1026.

Tsue, et al. (2013) "Nonporous but yet Gas-sorbing Molecular Crystals formed by Macrocyclic Compounds with Nitrogen Bridges," *Journal of the Crystallographic Society of Japan*, vol. 55, pp. 37 41 (Reference in Japanese with English Abstract).

Vaidhyanathan, et al. (2009) "An amine-functionalized metal organic framework for preferential $CO_2$ adsorption at low pressures," *Chem. Comm.* 35, pp. 5230-5232.

Vaidhyanathan, et al. (2009) "An amine-functionalized metal organic framework for preferential CO2 adsorption at low pressures," Chem. Comm. 35, pp. 5230-5232 Supporting Information.

Vaidhyanathan, et al. (2010) "Direct Observation and Quantification of $CO_2$ Binding Within an Amine-Functionalized Nanoporous Solid," *Science*, 330(6004), pp. 650-653.

Vaidhyanathan, et al. (2012) "Competition and Cooperativity in Carbon Dioxide Sorption by Amine-Functionalized Metal-Organic Frameworks," Angew. Comm., 51(8), pp. 1826-1829.

Vaidhyanathan, et al. (2012) "Competition and Cooperativity in Carbon Dioxide Sorption by Amine-Functionalized Metal-Organic Frameworks," *Angew. Comm.*, 51(8), pp. 1826-1829 Supporting Information.

Van Kralingen, et al. (1978) "Polymeric coordination compounds of nickel(II), cobalt(II), and zinc(II) with oxalate ions as symmetric tetradentate bridging ligands," *Transition Metal Chemistry*, 3(2):90-98.

Wang, et al. (2014) "New $Zn^{2+}$ coordination polymers with mixed triazolate/tetrazolate and acylhydrazidate as linkers," *CrystEngComm*, 16:2692-2701.

Wang et al. (2016) "A new three-dimensional $Zn^{2+}$ coordination polymer constructed from oxalate and 1,2,4-triazolate," *Spectrochimica Acta Part A: Molecular and Biomolecular Spectroscopy*, 161:138-143.

Yuan, et al. (2012) "Effect of pH/metal ion on the structure of metal-organic frameworks based on novel bifunctionalized ligand 4,-carboxy-4,2':6'/4"-terpyridine," *Cryst. Growth Des.*, 15(7), 2013, pp. 1460-1467.

Zhai, et al. (2007) "Coligand modulated six-, eight-, and ten-connected Zn/Cd-1,2,4-triazolate frameworks based on mono-, bi-, tri-, penta-, and heptanuclear cluster units", *Cryst. Growth Des.*, Jul. 2011, 2332-2342.

Zhai, et al. (2007) "Coligand modulated six-, eight-, and ten-connected Zn/Cd-1,2,4-triazolate frameworks based on mono-, bi-, tri-, penta-, and heptanuclear cluster units", *Cryst. Growth Des.*, Jul. 2011, 2332-2342 Supporting Information.

Zheng, et al. (2007) "Poly[bis($\mu_3$-3-amino-1,2,4-triazolato)-($\mu_2$-glutarato)dizinc(II)]," *Acta Cryst.*, E63, pp. m1252-m1253.

Zubir et al. (2016) "Magnetic Field Control of Micropore Formation in [$Zn_2$(Oxac)(Taz)$_2$]•($H_2O$)x," *Chem Lett*, 45, pp. 362-364.

Zubir et al. (Jan. 2017) "Micropore Formation of [$Zn_2$(Oxac)(Taz)$_2$]•($H_2O$)$_{2.5}$ via $CO_2$ Adsorption." Langmuir, 33, pp. 680-684.

SYNTHESIS OF ZINC MOF MATERIALS

CROSS-REFERENCE TO RELATED APPLICATIONS

This application is a U.S. National Stage Application filed under 35 U.S.C. § 371 of International Application No. PCT/CA2019/050530, filed Apr. 25, 2019, which claims the benefit of U.S. Provisional Patent Application No. 62/662,661, filed Apr. 25, 2018. Each of these applications is hereby incorporated by reference in its entirety.

BACKGROUND

Metal organic frameworks (MOFs)/porous coordination polymers (PCPs) are a class of network solids composed of organic spacers linking metal ions or metal ion clusters. These materials are useful in particular for adsorption of gases. Of significant interest is the use of MOF for adsorbing $CO_2$ from industrial effluents, for example, as a replacement for amine scrubbing of $CO_2$. MOFs possess ordered (crystalline) structures permeated by pores able to adsorb gas molecules. The regularity of these materials makes them amenable to structural characterization by X-ray diffraction techniques.

Water stability has been shown to be a weakness for many MOFs as even low amounts of atmospheric moisture can compromise order and the porosity. Some very stable zirconium (Zr) carboxylate MOFs have been reported (e.g., MIL-140 series, UiO-66 series), but identifying materials combining high capacity with high stability is a challenge.

U.S. Pat. No. 9,782,745, issued Oct. 10, 2017, reports certain MOFs which exhibit high $CO_2$ adsorption capacity with high selectivity for adsorption of $CO_2$ compared to nitrogen and which moreover exhibit good thermal stability and good stability to water. MOF therein could be subjected to a plurality of adsorption and desorption cycles with complete reversibility.

This U.S. patent claims priority to International application PCT/CA2014/000204, filed Mar. 11, 2014, published as WO2014/138878 on Sep. 18, 2014, and U.S. provisional application 61/776,223 filed Mar. 11, 2014. U.S. Pat. No. 9,782,745 and each of these priority patent documents is incorporated by reference herein in its entirety for the descriptions therein of MOF materials, methods of their preparation and methods of their use. Disclosed therein is a metal-organic framework (MOF) having pores and wherein the framework includes zinc ions, oxalate, and a cycloazocarbyl compound. The cycloazocarbyl compound of the MOF therein is described as at least bidentate, having 2, 3 or 4 nitrogen atoms, typically as part of a 5-membered ring. Examples of cycloazocarbyl compounds therein are imidazolates, triazolates and tetrazolates, and more particularly 1,2,4-triazolate, 1H-1,2,4-triazolate-1-carboxamidine, 3-amino-1,2,4-triazolate, imidazolate, 4-fluoroimidazolate, 2-methyl-imidazolate and 1,2,3,4-tetrazolate. In a specific embodiment therein, the cycloazocarbyl compound is a compound other than 3-amino-1,2,4-triazole. Of particular interest therein is a Zn (II) material designated CALF-20, having the chemical formula $Zn_2Tz_2Ox$ (where, Tz=1,2,4-triazolate, and Ox=oxalate).

U.S. Pat. No. 9,782,745 exemplifies the synthesis of CALF-20 performed as a batch process solvothermally in a sealed autoclave. In this procedure, Zn(II) oxalate and a stoichiometric excess of 1,2,4-triazole with respect to both Zn and oxalate was added to water and methanol in a polytetrafluoroethylene (PTFE)-lined autoclave. The mixture was subsequently heated in the sealed autoclave to 180° C. for 48 hours (i.e., at high pressure) and washed with water. The space-time yield for this process is relatively low, of the order of 40 kg/m3/h, making the cost of synthesis a significant limiting factor for CALF-20 and any related MOFs. The reaction could also be carried out in pure methanol or ethanol. Subsequently, it has been found that in some cases, CALF-20 prepared by the autoclave method contains zinc oxide impurity as assessed by PXRD (powder X-ray diffraction), that is fully removed by an annealing process that involves two steps of heating to 200° C. for 24 hours for each step, with a cooling and washing step in between. This purification step, however, adds additional time and cost to the synthesis of CALF-20.

The present disclosure relates to an improved synthetic procedure for preparation of CALF-20 and related MOFs, which avoids impurities and increases space-time yield, while avoiding high pressure, high temperature and the safety hazards associates with such conditions.

SUMMARY

The invention relates to a method for synthesis of a Zn MOF containing oxalate of formula: $Zn_2Ht_2Ox$, where Ht is a N-heterocyclic compound selected from 1,2,4-triazolate, or a combination of 1,2,4-triazolate and another N-heterocyclic compound. Oxalate is a dianion form of the diacid oxalic acid. In compounds herein oxalate functions as a divalent ligand which is generically called a chelating agent herein. More specifically, the invention provides a method for making a Zn MOF of formula:

$$Zn_2Ht_2CL,$$

where Ht is 1,2,4-triazolate or a combination of 1,2,4-triazolate and one or more other cycloazocarbyl compound, and CL is oxalate or a combination of oxalate and one or more chelating ligand other than oxalate, which comprises:

(1) reacting 2 molar equivalents of 1,2,4-triazole or the combination of 1,2,4-triazolate and one or more other cycloazocarbyl compound with 1 molar equivalent of oxalate or a combination of oxalate and one or more chelating ligand other than oxalate to form a cycloazocarbyl chelating ligand compound as a suspension in solvent; and (2) adding 2 molar equivalents of $Zn^{2+}$ to the suspension to form the Zn MOF. In an embodiment, step 1, step 2 or both step 1 and step 2 are conducted at a temperature less than or equal to 120° C. In an embodiment, step 1, step 2 or both step 1 and step 2 are conducted at a temperature less than or equal to 100° C. In an embodiment, step 1, step 2 or both step 1 and step 2 are conducted at room temperature.

In an embodiment, the N-heterocyclic compound is a 5- or 6-member ring cycloazocarbyl compound that is at least bidentate and wherein the ring contains 2, 3 or 4 nitrogen and the ring is optionally substituted with a non-hydrogen substituent selected from —$NH_2$, C1-C3 alkyl amino, C1-C3 dialkyamino, C1-C3 alkyl, C2-C3 alkenyl, or C2-C3 alkynyl. In a specific embodiment, the cycloazocarbyl compound is bidentate. In a specific embodiment, the cycloazocarbyl compound has a 5-member ring. In a specific embodiment, the cycloazocarbyl compound is unsubstituted. In a specific embodiment, the cycloazocarbyl compound is bidentate and unsubstituted. In specific embodiments, the cycloazocarbyl compound is unsubstituted 1,2,4-triazolate, unsubstituted 1,2,3-triazolate, unsubstituted tetrazolate, unsubstituted imidazolate, or unsubstituted pyrazolate. In a specific embodiment, the N-heterocyclic compound is bidentate. In a specific embodiment, the N-heterocyclic compound is water soluble or soluble in a lower alcohol, particularly methanol or ethanol, or soluble in a miscible mixture of water and lower alcohol. In a specific embodiment, the cycloazocarbyl compound is water soluble or soluble in a lower alcohol, particularly methanol or ethanol, or soluble in a miscible mixture of water and lower alcohol. In a specific embodiment, the cycloazocarbyl compound is soluble in water.

In embodiments, the cycloazocarbyl compound is an imidazolate, a triazolate, a pyrazolate or a tetrazolate. In specific embodiments, the cycloazocarbyl compound is imidazolate, 1,2,4-triazolate, 1,2,3-triazolate, pyrazolate, or tetrazolate. In embodiments, the cycloazocarbyl compound is a 1,2,4-triazolate. In an embodiment, the cycloazocarbyl compound is selected from the group consisting of 1H-1,2,4-triazolate-1-carboxamidine, 3-amino-1,2,4-triazolate, imidazolate, 4-fluoroimidazolate, 2-methyl-imidazolate and 1,2,3,4-tetrazolate. In an embodiment, the cycloazocarbyl compound is a compound other than 3-amino-1,2,4-triazolate. In a specific embodiment, the cycloazocarbyl compound is unsubstituted 1,2,4-triazolate. In specific embodiments the zinc ion is $Zn^{2+}$.

The following embodiments are described with respect to unsubstituted 1,2,4-triazole which forms unsubstituted 1,2,4-triazolate in the Zn MOF. In each of the following synthetic embodiments, an alternative N-heterocyclic compound as discussed above can be substituted as a reactant, in whole, or preferably in part, for the 1,2,4-triazole to form a Zn MOF having a cycloazocarbyl ligand different than 1,2,4-triazolate or a mixture of cycloazocarbyl ligands including 1,2,4-triazolate. When substituted in part for 1,2,4-triazole, the molar ratio of 1,2,4-triazole to the other cycloazocarbyl compound added to the reaction ranges from 1:1 (50 mole % of each) to 100:1. In an embodiment, this molar ratio is greater than or equal to 5:1. In an embodiment, this molar ratio is greater than or equal to 10:1. In an embodiment, this molar ratio is greater than or equal to 20:1. In an embodiment, this molar ratio is greater than or equal to 50:1. In a specific embodiment, a mixture of 1,2,4-triazole and one or more of imidazole or pyrazole is employed in the reaction. It will be appreciated that two or more cycloazocarbyl compounds in addition to 1,2,4-triazole can be employed in reactions herein. In such cases, the molar ratio of 1,2,4-triazole to that of the total mixture of other cycloazocarbyl compounds is as noted above. The hydrate of oxalic acid can be oxalic acid dihydrate.

In additional synthetic embodiments herein, an alternative chelating agent can be substituted as a reactant, in whole or preferably in part, for the oxalate to form a Zn MOF having a chelating ligand different than oxalate or a mixture of oxalate and another chelating ligand. In specific embodiments, the alternative chelating agent is the dianion of a diacid, such as a dicarboxylic acid. In a specific embodiment, the dicarboxylic acid is squaric acid. In another embodiment, the alternative chelating agent is a dithio compound such as rubeanic acid. When substituted as a reactant in part for oxalate, the molar ratio of oxalate to the other chelating ligand added to the reaction ranges from 1:1 (50 mole % of each) to 100:1. In an embodiment, this molar ratio is greater than or equal to 5:1. In an embodiment, this molar ratio is greater than or equal to 10:1. In an embodiment, this molar ratio is greater than or equal to 20:1. In an embodiment, this molar ratio is greater than or equal to 50:1. In a specific embodiment, a mixture oxalate and squarate (squaric acid), or rubeanate (rubeanic acid) is employed in the reaction. It will be appreciated that two or more chelating ligands in addition to oxalate can be employed in reactions herein. In such cases, the molar ratio of oxalate to that of the total mixture of other chelating ligands is as noted above.

In another embodiment, the Zn MOF herein can contain a mixture of oxalate and one or more different chelating ligand, particularly wherein the chelating ligand is squarate, or rubeanate, and can contain a mixture of 1,2,4-triazolate and one or more different cycloazocarbyl compound, particularly where the cycloazocarbyl compound is imidazole or pyrazole. In a specific embodiment, the amount of the one or more different chelating ligand is less than 10 mol % of the total chelating ligand including oxalate present and the amount of the one or more different cycloazocarbyl compound is less than 10 mol %, of the total cycloazocarbyl compound present including 1,2,4-triazole. When substituted in part for oxalate, the molar ratio of oxalate to the other chelating ligand(s) added to the reaction ranges from 1:1 (50 mole % of each) to 100:1 and when substituted in part for 1,2,4-triazole, the molar ration of 1,2,4-triazole to the other cycloazocarbyl compound added to the reaction ranges from 1:1 (50 mole % of each) to 100:1. In an embodiment, this molar ratio is greater than or equal to 5:1. In an embodiment, this molar ratio is greater than or equal to 10:1. In an embodiment, this molar ratio is greater than or equal to 20:1. In an embodiment, this molar ratio is greater than or equal to 50:1. In a specific embodiment, a mixture of oxalate and squarate (squaric acid), or rubeanate (rubeanic acid) is employed in the reaction. It will be appreciated that two or more chelating ligands in addition to oxalate can be employed in reactions herein. In such cases, the molar ratio of oxalate to that of the total mixture of other chelating ligands is as noted above.

The disclosure further relates to Zn MOF containing oxalate and 1,2,4-triazolate of formula: $Zn_2Ht_2CL$, where Ht is a combination of 1,2,4-triazolate and one or more other N-heterocyclic compound, and CL is a combination of oxalate and one or more chelating ligands other than oxalate. In particular, the disclosure relates to Z MOF wherein the other cycloazocarbyl compound is imidazolate, 1,2,3-triazolate, pyrazolate, or tetrazolate and/or wherein the other chelating ligand is squarate (squaric acid), or rubeanate (rubeanic acid)

In one embodiment, oxalic acid or a hydrate thereof (1 mol equivalent) and 1,2,4-triazole (2 mol equivalent) are dissolved and/or suspended in a lower alcohol or a miscible mixture of a lower alcohol and water, preferably ethanol or aqueous ethanol, to form a milky white precipitate of 1,2,4-triazolium oxalate. To this suspension, a basic zinc salt (2 mol equivalent of Zn) is added as a solid with vigorous stirring to form a viscous, milky white suspension. The suspension is then stirred at room temperature until reaction to form CALF-20 is complete as assessed by PXRD. This reaction may take up to 16-22 hours at room temperature. The solid product CALF-20 is collected by filtration, washed sequentially with water and ethanol (e.g., 5-10 mL each), and dried at room temperature. In a specific embodiment, the hydrate of oxalic acid is oxalic acid dihydrate. In this embodiment, oxalate can be replace with a mixture of oxalate and one or more different chelating ligand, particularly squarate (squaric acid), or rubeanate (rubeanic acid). In this embodiment, oxalate can be replaced with a mixture of oxalate and one or more different dicarboxylic acid. In this embodiment, 1,2,4-triazole can be replaced with a mixture of 1,2,4-triazole with one or more different cycloazocarbyl compound, particularly imidazole or pyrazole. In such mixtures the alternative chelating agent or dicarboxylic acid and/or the alternative cycloazocarbyl compound is present in an amount equal to or less than 10 mole %.

In a more preferred embodiment, oxalic acid or a hydrate thereof (1 mol equivalent) is dissolved in a lower alcohol (C1-C4 alcohol) (e.g., 250 mL, for 1 mol). Separately, 1,2,4-triazole (2 mol equivalent) is suspended or dissolved in a lower alcohol or water, respectively, (250 mL, for 2 mol). The two solutions are then added together to form a milky white precipitate of 1,2,4-triazolium oxalate in the alcohol/water mixture. In a specific embodiment, the hydrate of oxalic acid is oxalic acid dihydrate. In this embodiment, oxalate can be replace with a mixture of oxalate and one or more different chelating ligands, particularly squarate (squaric acid), or rubeanate (rubeanic acid). In this embodiment, 1,2,4-triazole can be replaced with a mixture of 1,2,4-triazole with one or more different cycloazocarbyl compounds, particularly imidazole or pyrazole. When such mixtures are used, it will be appreciated that a mixture of compounds of the chelating agent with the cycloazocarbyl compound may be formed.

To this suspension, a basic zinc salt (2 mol equivalent of Zn) is added as a solid with vigorous stirring to form a viscous, milky white suspension. The suspension is then stirred at room temperature until reaction to form CALF-20 is complete as assessed by PXRD. This reaction may take up to 16-22 hours at room temperature. The solid product is collected, washed and dried at room temperature as noted above. The basic zinc salt can be basic zinc carbonate, zinc hydroxide, or zinc oxide, which are sparingly soluble to non-soluble in alcohol, water or a mixture thereof. In an embodiment, the basic zinc salt is added as a solid, preferably as a powder, with vigorous stirring to form a viscous, milky white suspension. In an embodiment, the solid can be added as a finely divided powder. In an embodiment, the basic zinc salt is basic zinc carbonate.

The mixture prepared in aqueous lower alcohol, preferably aqueous ethanol and more preferably 50% by volume aqueous ethanol, can be heated at temperatures above ambient to about 120° C., and preferably to about 100° C. or more preferably to about 90° C. (after or before and after addition of basic zinc salt) to speed up reaction. At about 90° C., the reaction to form CALF-20 is found to be complete in about 10-20 minutes. Alternatively, the mixture in aqueous alcohol (miscible combinations thereof) containing the suspension of 1,2,4-triazolium oxalate can be heated to reflux at ambient pressure (after or before and after zinc addition), where the temperature of the reaction depends upon the aqueous alcohol mixture employed. More specifically reflux of the mixture is conducted at ambient pressure.

Completion of reaction is measured using quenched aliquots monitored by PXRD to measure the formation of CALF-20 and the disappearance of an unknown crystalline by-product by PXRD. The reaction is quenched by filtration because solvent is needed for the two suspended solid phases to react. When the solvent is removed, the reaction stops.

When oxalic acid or a hydrate thereof and 1,2,4-triazole are both added to aqueous lower alcohol to form the suspension of 1,2,4-triazolium oxalate, care should be taken, that the reaction to form 1,2,4-triazolium oxalate goes to completion with stirring at room temperature (or other selected temperature), before continuing the synthesis by addition of the basic zinc salt. Completion of reaction is assessed by PXRD.

In another alternative embodiment, a water soluble zinc salt, such as $ZnCl_2$ or $Zn(NO_3)_2$, 2 mol equivalents, is first added to the suspension of 1,2,4-triazolium oxalate. Thereafter, 2 mol equivalents of base (e.g., sodium hydroxide) is added to the reaction for each mol equivalent of zinc and the mixture is mixed and optionally heated as described above to precipitate the CALF-20 product.

The solid Zn MOF product of the forgoing methods is collected from the suspension by any suitable filtration method and washed with appropriate solvent, water, lower alcohol or a miscible mixture thereof. The washing solvent(s) may be the same or different from those employed in the reaction. The washing solvent(s) are preferably the same as the solvent or solvents used in the reaction.

Other aspects and embodiments of the disclosure will be recognized by one of ordinary skill in the art on review of the following detailed description, figures and non-limiting examples.

DETAILED DESCRIPTION

Figure 1:
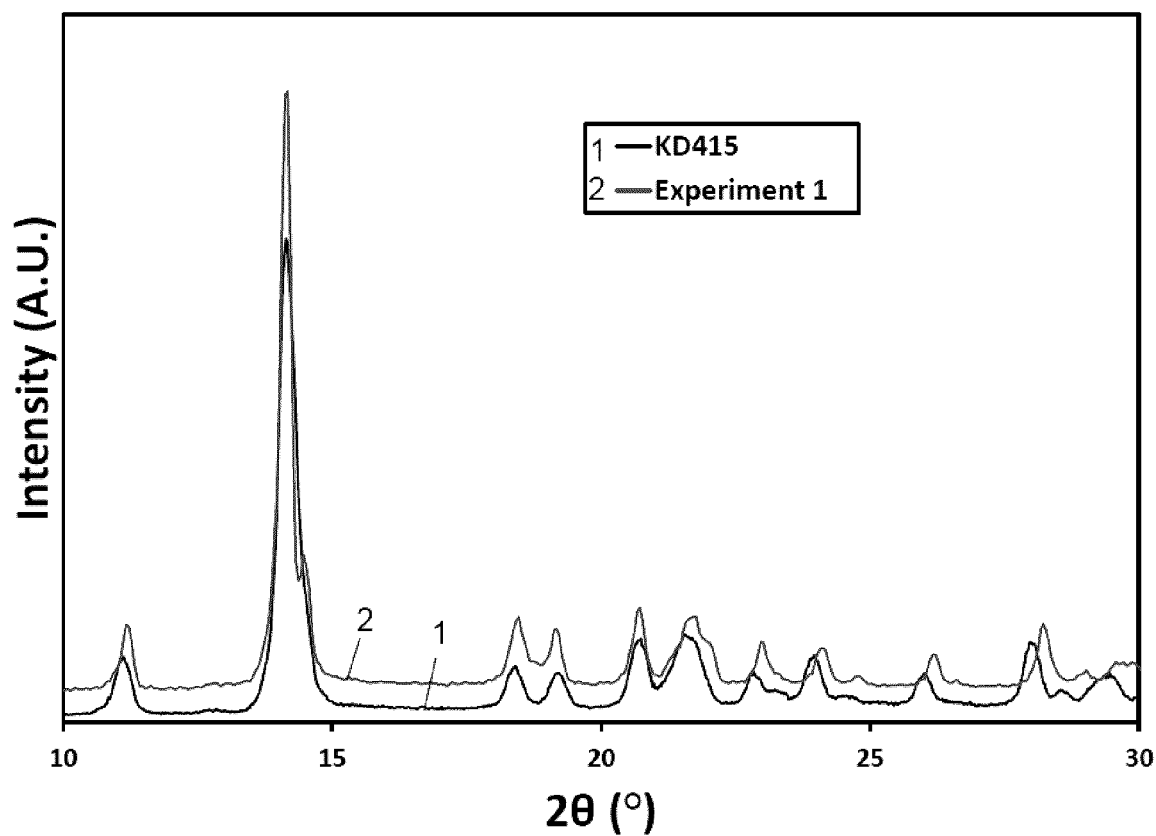
FIG. 1 compares the PXRD of KD415 to that of the material made as described in Example 1.

The invention relates to Zn MOF containing oxalate and certain N-heterocyclic ligands which are porous and adsorb gases such as $CO_2$. The Zn MOF of this invention have properties at least as described for exemplary MOF CALF-20 in U.S. Pat. No. 9,782,745 exhibiting high adsorption of $CO_2$, typically $CO_2$ adsorption of 4.0 mmol/g or greater is observed.

In specific embodiment, the Zn MOF prepared by the methods herein exhibits selectively for adsorption of $CO_2$ relative to adsorption of $N_2$. Selectively of adsorption can be assessed as illustrated in Vaidhyanathan R. et al. (2009) Chem. Comm. 5230-5232. In specific embodiments, the Zn MOF as prepared herein exhibits selectivity for adsorption of $CO_2$ relative to $N_2$ of at least 2 fold. In other specific embodiments, the Zn MOF as prepared herein exhibits selectivity for adsorption of $CO_2$ relative to $N_2$ of at least 5 fold. In other specific embodiments, the Zn MOF as prepared herein exhibits selectivity for adsorption of $CO_2$ relative to $N_2$ of at least 10 fold.

The reaction to form Zn MOF proceeds by reaction of Zn with a cycloazocarbyl oxalate or a mixture of this oxalate with a compound formed from cycloazocarbyl and the alternative chelating agent (e.g., diacid anion or dithio anion). The reaction can be performed at ambient room temperature and ambient pressure in pure ethanol, pure methanol, or other short chain alcohols (C3 or C4 alcohols), or in miscible mixtures of these alcohols with water. It has been found that when water alone is used, an unknown, non-porous crystalline by-product is formed which complicates the synthesis and can lead to products with lower levels of $CO_2$ adsorption. However, using pure alcohol solvents appears to give final product with reduced crystallinity and with up to 5-10% less porosity to $CO_2$ at 273° K by gas sorption analysis. Thus, in a preferred embodiment, aqueous alcohol and particularly aqueous ethanol is used as the solvent for the reaction of Zn to form the Zn MOF.

An important aspect of the improved synthesis herein is the use of the stoichiometric 1,2,4-triazolium oxalate adduct (or its mixture with the corresponding alternative adducts, such as the alternative cycloazocarbyl oxalate or 1,2,4- triazolium alternative chelating agent adduct) as the source of the ligands in CALF-20. In general with other cycloazocarbyl compounds, the stoichiometric cycloazocarbyl oxalate adduct is formed. In general with other chelating agents, the stoichiometric cycloazocarbyl chelating agent adduct is formed. When the oxalate or alternative ligand source is added in stoichiometric excess, a crystalline zinc oxalate or related by-product results. In the present work, this zinc oxalate by-product once formed could not be removed. When the cycloazocarbyl and oxalic acid or other ligand sources are added separately to the source of Zn, a crystalline zinc oxalate by-product can result. In this work, this zinc oxalate once formed could not be removed. If the basic zinc reagent is added in excess, it will not fully react with the cycloazocarbyl oxalate and will remain as an impurity in the final product.

The general Zn MOF product has stoichiometry $Zn_2Ht_2Ox$, where Ht is the cycloazocarbyl and Ox is oxalate or combination of oxalate and optional other ligand. The specific product CALF 20 has stoichiometry $Zn_2Tz_2Ox$, where Tz is 1,2,4-triazolate and Ox is oxalate. It is currently believed that the reaction to form the Zn MOF and particularly CALF-20, is preferably performed with at most a 5% stoichiometric excess of any one component. We note that a reaction performed in error by not adding enough of the zinc reagent, with the adduct in ~25% excess, resulted in formation of significant crystalline impurities. In a more preferred embodiment, the reaction to form CALF 20 is performed with at most a 5% stoichiometric excess of any one component. In a more preferred embodiment, the reaction to form CALF 20 is performed with at most a 2% stoichiometric excess of any one component. In a more preferred embodiment, the reaction to form CALF 20 is performed with at most a 1% stoichiometric excess of any one component. When the cycloazocarbyl compound is 1,2,4-triazolate, and particularly when made with $Zn^{2+}$, in an embodiment, the Zn MOF prepared by the methods herein has a powder X-ray diffraction pattern having the highest intensity diffraction peak in the range $10°<2\theta<15°$ with Cu K alpha radiation.

The term alkyl refers to a monovalent saturated hydrocarbon radical which may contain from 1 to 12 carbon atoms (a C1-C12 alkyl). The alkyl group may be straight-chain or branched. The alkyl group is optionally substituted. In specific embodiments, alkyl is a C1-C3 alkyl.

The term aminoalkyl refers to an —NHR monovalent radical, where R is an alkyl group as described above. The term dialkylamino refers to an —N(R)$_2$ monovalent radical, where each R is an alkyl group as described above. In specific embodiments, R is a C1-C3 alkyl.

The term amino refer to an —NH$_2$ group.

The term cycloalkyl refers to an alkyl radical having a 3-8 member carbon ring. The cycloalkyl group is optionally substituted. In specific embodiments, the cycloalkyl is cyclohexyl.

The term alkenyl refers to a monovalent hydrocarbon radical containing one or more double bonds, which may contain from 2 to 12 carbon atoms (a C1-C12 alkyl). The alkenyl group may be straight-chain or branched. The alkenyl group is optionally substituted. In an embodiment, an alkenyl group contains one double bond. In an embodiment, the alkenyl is a C2-C6 or a C2-C3 alkenyl.

The term cycloalkenyl refers to an alkenyl radical having a 3-8 member carbon ring. The one or more double bonds are in the carbon ring. The cycloalkyl group is optionally substituted. In an embodiment, a cycloalkenyl group contains one double bond. In an embodiment, the cycloalkenyl is cyclohexenyl.

The term alkynyl refers to a monovalent hydrocarbon radical containing one or more triple bonds, which may contain from 2 to 12 carbon atoms (a C2-C12 alkynyl). In a specific embodiment, the alkynyl is a C2-C6 or a C2-C3 alkynyl.

The term N-heterocyclic refers to a chemical species that contains a 5-8 member ring wherein the ring contains at least one nitrogen. The other ring members may be carbon, one or more additional nitrogen or one or more oxygen or sulfurs. The ring may contain one or more double bonds or be aromatic. In specific embodiments, the heterocyclic ring contains a 5- or 6-member ring with one to four nitrogens with the remaining ring members being carbon. The N-heterocycle is optionally substituted. Optional substitution herein refers to possible substitution with one or more non-hydrogen substituent selected from —NH$_2$, C1-C3 alkyl amino, C1-C3 dialkyamino, C1-C3 alkyl, C2-C3 alkenyl, or C2-C3 alkynyl.

The term lower alcohol refers to alkyl alcohols having 1-4 carbon atoms and includes all isomers thereof. The term includes mixtures of lower alcohols. In a specific embodiment, the lower alcohol is ethanol. In a specific embodiment, the lower alcohol is not methanol.

Aqueous alcohol refers to mixtures containing water and alcohol, preferably lower alcohol. Aqueous alcohol may contain a mixture of two or more alcohols, preferably a mixture of two or more lower alcohols. In embodiments, aqueous alcohol contains one lower alcohol. In embodiments, aqueous alcohol is aqueous ethanol. In embodiments, aqueous alcohol is aqueous methanol. In embodiments, aqueous alcohol contains 10% or more by volume of one or more alcohols, particularly one or more lower alcohols. In embodiments, aqueous alcohol contains 25% or more by volume of one or more of one or more alcohols, particularly one or more lower alcohols. In embodiments, aqueous alcohol contains 50% or more by volume of one or more alcohols, particularly one or more lower alcohols. In embodiments, aqueous alcohol contains 75% or more by volume of one or more alcohols, particularly one or more lower alcohols. In embodiments, aqueous alcohol contains 90% or more by volume of one or more alcohols, particularly one or more lower alcohols. In embodiments, aqueous alcohol contains 40-60% by volume of one or more alcohols, particularly one or more lower alcohols. In embodiments, aqueous alcohol contains 50%+/−10% by volume of one or more alcohols, particularly one or more lower alcohols. In embodiments, aqueous alcohol contains 50%+/−1% by volume of one or more alcohols, particularly one or more lower alcohols. In embodiments, the solvent used is 50% aqueous ethanol. In embodiments, the solvent used is 50% aqueous methanol.

The methods herein are for preparing a porous metal organic framework (MOF) comprising at least an oxalate and at least one N-heterocyclic compound and more particularly a cycloazocarbyl compound coordinated to at least one zinc ion. The method comprises the step of forming a cycloazocarbyl oxalate (or other chelating ligand) compound, particularly a 1,2,4-triazolium oxalate, and reacting the cycloazocarbyl oxalate with $Zn^{2+}$ to form the desired Zn MOF. The step of forming the cycloazocarbyl oxalate can be carried out in the presence of water, a lower alcohol (i.e., a C1-C4 alcohol) or a mixture thereof or a mixture of water and lower alcohol. In a specific embodiment, the solvent employed for forming the cycloazocarbyl oxalate is a lower alcohol or a miscible mixture of water and a lower alcohol. In an embodiment, the lower alcohol is methanol or ethanol. In an embodiment the cycloazocarbyl oxalate is formed in the presence of water and at least one lower (C1-C4) alcohol. In an embodiment, the ratio of water:alcohol (v/v) is between about 1:10 and 10:1. More specifically, the volume ratio of water:alcohol is between 2:1 and 1:2, and more specifically between 1.5:1 and 1:1.5 or between 1.25:1 and 1.25:1. In a specific embodiment, the volume ratio of water to total lower alcohol is about 1:1. In an embodiment, the alcohol is ethanol, propanol (various isomers including isopropanol) or butanol. In an embodiment, the alcohol is methanol and the volume ratio of water:methanol is 1:1 to 1:10 or this ratio is 2:3 to 3:2. In a specific embodiment, the solvent employed is ethanol and the volume ratio of water to ethanol is 1:1 to 1:10 or this ratio is 2:3 to 3:2. In a specific embodiment, the solvent is about 1:1 (V:V) water to lower alcohol. In an embodiment, the solvent is other than pure water. In an embodiment, the solvent is other than pure lower alcohol. In an embodiment, the solvent is other than pure ethanol or pure methanol. In an embodiment, the cycloazocarbyl oxalate is formed at room temperature and ambient pressure. In an embodiment, the cycloazocarbyl oxalate is formed at a temperature ranging from room temperature to 100° C., at ambient pressure. In an embodiment, the cycloazocarbyl oxalate is formed at temperatures of 90° C. or less. In a specific embodiment, a useful Zn MOF is prepared by initial mixing of separate solutions or suspensions of oxalate and cycloazocarbyl compound, respectively, each in lower alcohol, water or a miscible mixture thereof, to form the cycloazocarbyl oxalate as a suspension in the mixed solvents. More specifically, the cycloazocarbyl oxalate is formed by mixing a solution of oxalic acid in ethanol with a solution of the cycloazocarbyl compound in water. In this case the cycloazocarbyl compound is water soluble. In a specific embodiment, the resulting mixture contains water and ethanol in a volume ratio of 3:2 to 2:3 and more preferably in a volume ratio of about 1:1. The separate solutions, respectively, contain the desired stoichiometric amount of the oxalic acid or the cycloazocarbyl compound, which is a molar ratio of 1:2 oxalic acid to cycloazocarbyl compound. Preferably, the oxalic acid and cycloazocarbyl compound are combined with at most a 5% stoichiometric (molar) excess or deficiency of either component. In a more preferred embodiment, the oxalic acid and cycloazocarbyl compound are combined with at most a 2% stoichiometric (molar) excess or deficiency of either component. In a more preferred embodiment, the oxalic acid and cycloazocarbyl compound are combined with at most a 1% stoichiometric (molar) excess or deficiency of either component. Following formation of the cycloazocarbyl oxalate (or combination with other chelating ligand) compound of desired stoichiometry, $Zn^{2+}$ is added to the suspension to form the desired Zn MOF. There are several ways in which the $Zn^{2+}$ can be added and reacted with the cycloazocarbyl oxalate compound. A basic Zn salt, which is at most sparingly soluble in water, alcohol or mixtures thereof is added to the suspension containing the cycloazocarbyl oxalate as a solid. The addition is made with vigorous stirring. Preferably, Zn is added to the cycloazocarbyl oxalate in at most a 5% stoichiometric (molar) excess or deficiency with respect to the cycloazocarbyl and oxalic acid components. In a more preferred embodiment, the Zn is added with at most a 2% stoichiometric (molar) excess or deficiency with respect to either component. In a more preferred embodiment, Zn is added compound with at most a 1% stoichiometric (molar) excess or deficiency with respect to either component.

Unintended deviations from desire stoichiometric can occur, as will be appreciated by one of ordinary skill in the art, if the starting materials employed contain impurities. Starting materials of purity needed to achieve the desired stoichiometry are commercially available or can be prepared by methods well known in the art. The resulting mixture is then stirred until formation of the Zn MOF is complete as assessed by PXRD. The reaction with Zn can be conducted at ambient room temperature or optionally at a temperature up to about 100° C. The basic Zn salt can be suspended in water, lower alcohol or a mixture thereof and the Zn suspension can be added to the suspension containing the cycloazocarbyl oxalate. One or both of the suspensions are optionally heated to above room temperature. In a specific embodiment, both suspensions are heated to a temperature above ambient up to about 120° C. and in a more specific embodiment to a temperature of about 100° C., and yet more specifically to a temperature of about 90° C. In another specific embodiment, after addition of Zn solid or Zn suspension, the resulting reaction mixture is heated above room temperature up to about 120° C. and in a more specific embodiment to a temperature of about 100° C., and yet more specifically to a temperature of about 90° C. In another specific embodiment, after addition of Zn solid or Zn suspension, the reaction mixture can be heated to reflux employing an appropriate condenser or related known equipment to avoid loss of solvent, the temperature of which reflux depends on the solvent or solvent mixture employed. Heating the reaction mixture is found to increase the rate of formation of the Zn MOF product. At a given reaction temperature, the time needed for completion of the reaction to form the desired Zn MOF product can be determined as described herein in the examples by following completion of the formation of the product. The solvents used in the reaction with Zn are dependent upon the solvents used to form the cycloazocarbyl oxalate suspension and any solvent that may be used to add a Zn suspension.

After the reaction of Zn with the cycloazocarbyl oxalate is complete, the reaction suspension is cooled to room temperature, if necessary (or below if desired), and the solid product formed is separated from solvent by any appropriate form of filtration. The collected solid is washed with water, aqueous lower alcohol or lower alcohol and then dried in air typically at atmospheric pressure. The solid can alternative be heated and/or appropriate vacuum may be applied to remove residual solvent and water if any from the solid. Drying may involve heating to 100-150° C. optionally under reduced pressure.

In another alternative, Zn may be added to the cycloazocarbyl oxalate suspension as a solution in water, lower alcohol or a mixture thereof. In this case, a water soluble Zn salt such as $Zn(NO_2)_2$, $ZnCl_2$ or $ZnSO_4$ is dissolved in water or aqueous alcohol and the desired stoichiometric amount of Zn is added to react. In this case, the reaction is allowed to stir at the selected temperature (among others at room temperature, a temperature up to 90° C. or in refluxing solvent) and the solid product is collected, washed and dried as described above.

The solid Zn MOF product may be subjected to additional heating and or washing steps to remove unwanted impurities as desired or needed for a given application of the material. The solid Zn MOF may be further processed to form a solid of desired particle size or subjected to activation if needed or desired.

In specific embodiments, the reaction of Zn with the cycloazocarbyl oxalate is carried out in aqueous alcohol, including aqueous ethanol, aqueous propanol (including aqueous isopropanol) or aqueous butanol.

In specific embodiments, the reaction with Zn is carried out at a selected temperature in the range from ambient room temperature to about 120° C. More specifically, the reaction can in the alternative be carried out at a temperature in the following ranges: 20° C. to 120° C., 20° C. to 100° C., 20° C. to 90° C., 20° C. to 80° C., 20° C. to 70° C., 20° C. to 60° C., 20° C. to 50° C., 50° C. to 100° C., or 50° C. to 90° C. or other subranges thereof. More specifically, the reaction can be carried out at the following temperatures: about 100° C., or about 90° C., or about 75° C., or about 50° C., or about 20° C., where about represents a variation of at most 10% of the number given. In a specific embodiment, the reaction is carried out without heating at ambient room temperature. In a specific embodiment, the reaction is carried out at controlled room temperature of 20° C.±20%. In specific embodiments, the reaction with Zn is carried out in refluxing solvent.

In a specific embodiment of the method, the reaction mixture containing cycloazocarbyl oxalate is formed at a mixing temperature that is less than the selected temperature for reaction with Zn. In an embodiment, the method further comprises the step of ramping the temperature from the mixing temperature to the selected temperature. In a specific embodiment, the mixing temperature may be ambient room temperature or controlled room temperature (20° C.±20%) and the reaction temperature may be between 50° C. and 120° C. and more preferably from 50° C. to 100° C. In a specific embodiment, the ratio of the reaction time to the ramping time is at least 2, or is at least 3, or is at least 4, or is at least 5 or is at least 6.

In the preparation method of the invention, the cycloazocarbyl compound can be selected from an imidazole, a triazole or a tetrazole. In a preferred embodiment, the cycloazocarbyl compound is a triazole and more specifically is an unsubstituted triazole and yet more specifically is an unsubstituted 1,2,4 triazole. More specifically the triazole is 1H-1,2,4-triazole or 4H-1,2,4-triazole.

In a specific embodiment, the preparation method proceeds at atmospheric pressure. However, it will be appreciated that the reaction can be adapted to use of higher than atmospheric pressure, for example, with modification of temperature. However, the use of elevate pressure is not preferred. In a specific embodiment, the pressure of the reaction is less than 20× atmospheric pressure. In a specific embodiment, the pressure of the reaction is less than 10× t pressure. In a specific embodiment, the pressure of the reaction is less than 5× ambient pressure. It will be appreciated that ambient pressure can vary significantly dependent at least upon altitude. Normal atmospheric pressure (at sea level) is 1 atm (101.3 KPa). In a specific embodiment, the reaction proceeds with heating. In a specific embodiment, the reaction proceeds for at least 2 hours. More specifically, the reaction can proceed for or at least for 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47 or 48 hours.

After the reaction is complete, the Zn MOF material formed can be subsequently washed with an organic solvent, for example an alcohol, particular an alcohol other than that used as solvent, acetone or other readily removable organic solvent.

In an embodiment, the porous Zn MOF material prepared by the methods herein is in the form of a powder. In an embodiment, the powder has a Langmuir surface area of at least 450 m$^2$/g determined according to the Langmuir sorption model applied to a nitrogen sorption isotherm at 77° K, as is known in the art. In a more specific embodiment, the porous Zn MOF material prepared by the methods herein has a Langmuir surface area of at least 500 m$^2$/g.

In an embodiment, the porous Zn MOF material prepared by the methods herein is in the form of a powder having a BET (Brunauer-Emmett-Teller) surface area of at least 500 m$^2$/g as determined from the $CO_2$ sorption isotherms at 273K, as is known in the art. In a more specific embodiment, the porous Zn MOF material prepared by the methods herein has a BET (Brunauer-Emmett-Teller) surface area of at least 550 m$^2$/g.

The Zn MOF prepared by the methods herein has pores. In an embodiment, pore size ranges from 0.3 to 2 nm. Preferred Zn MOF prepared by the methods herein can have pore size ranging in nm from 0.4 to 1.9, from 0.5 to 1.8, from 0.6 to 1.7, or from 0.7 to 1. In specific embodiments, Zn MOF prepared by the methods herein can have pore size in nm or about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9 or about 2.0.

The Zn MOF materials in powder or granular form are preferably activated prior to use for adsorbing $CO_2$. Methods for activating such materials are known in the art. In specific embodiment, the Zn MOF materials are activated by heating under reduced pressure. More specifically, the Zn MOF materials are activated by heating to a temperature of from about 100° C. to about 150° C. at a reduced pressure, e.g., $10^{-3}$ mbar or less, and preferably $10^{-6}$ mbar. In an embodiment, Zn MOF materials can be activated in a two-step heating process under reduced pressure (preferably $10^{-6}$ mbar) with a first step of heating to 60° C. for 2 hours followed by heating to 100° C. for 12 hours. Activation may be accomplished by heating at a controlled rate (e.g., 1 C/min) or at one or more selected temperatures for a selected time. For example, the Zn MOF can be activated by heating to 60° C. at 1 C/min for 2 hours followed by heating to 100° C. at 1° C./min for 12 hours. In another embodiment, the Zn MOF materials are treated or washed with an organic solvent, such as acetone, prior to heating under reduced pressure.

The porous Zn MOF material prepared as described herein can be employed in a method for the separation of carbon dioxide from a gas mixture containing carbon dioxide comprising the step of (a) contacting the gas mixture with at least one sorbent comprising this porous MOF material. In specific embodiment, the gas mixture contains in addition to carbon dioxide at least one gas selected from the group consisting of nitrogen, oxygen, methane, hydrogen, water vapor, carbon monoxide, hydrogen sulfide, sulfur dioxide, nitrogen dioxide, and any mixture of the foregoing. In specific embodiments the gas mixture contains at least two gases in addition to $CO_2$. In an embodiment, the gas mixture contains water vapor. In an embodiment, the gas mixture is selected from the group consisting of natural gas, air, shale gas, and flue gas. In an embodiment, the natural gas, air, shale gas, or flue gas containing water vapor.

The porous Zn MOF materials prepared by the methods herein can be employed in a method of absorbing carbon dioxide, storing the carbon dioxide, or absorbing and storing the carbon dioxide, the method comprising contacting this porous material under conditions suitable for adsorption of the carbon dioxide.

The porous Zn MOF materials prepared by the methods herein can be formed into granules having particle size ranging from 50 to 3000 nm and more specifically from 100-3000 nm. More specifically particle sizes of granules can range from 100-1000 nm. Methods are known in the art for forming powders into granules (granularization). In an embodiment, such methods comprise contacting the powder with a granularization liquid, for example a polymer in a suitable organic solvent under suitable conditions for formation of granules having the desired particle size. Granularization liquids may further comprise one or more surfactants. Methods useful for application to forming granules of MOF materials include those employing polysulfone [L. Li, J. Yao, P. Xiao, J. Shang, Y. Feng, P. A. Webley, H. Wang, Colloid Polym. Sci. 2013, 291, 2711-2717]; polylactic acid Q. Qian, X. Huang, X. Zhang, Z. Xie, Y. Wang, Angew. Chem., Int. Ed. 2013, 52, 3010625-10629]; polyethylene glycol (e.g., PEG 6000) and/or polyvinylpyrrolidone (PVP) [T. Thirugnanam, Journal of Nanomaterials 2013. 10.1155/2013/362175].

The Zn MOF materials as prepared by the methods herein can be employed and processed as described in U.S. Pat. No. 9,782,745 which is incorporated by reference herein in its entirety for such application methods and method of preparation of adsorbents containing Zn MOF materials.

All references throughout this application, for example patent documents including issued or granted patents or equivalents; patent application publications; and non-patent literature documents or other source material; are hereby incorporated by reference herein in their entireties, as though individually incorporated by reference. All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents, species or compounds is disclosed herein, it is understood that all individual members of those groups and all subgroups, including any isomers and enantiomers of the group members, and classes of compounds that can be formed using the substituents are disclosed separately. When a compound is claimed, it should be understood that compounds known in the art including the compounds disclosed in the references disclosed herein are not intended to be included. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. Specific names of compounds, if used, are intended to be exemplary, as it is known that one of ordinary skill in the art can name the same compounds differently. When a compound is described herein such that a particular isomer or enantiomer of the compound is not specified, for example, in a formula or in a chemical name, that description is intended to include each isomers and enantiomer of the compound described individual or in any combination.

One of ordinary skill in the art will appreciate that methods, starting materials, and synthetic methods other than those specifically exemplified can be employed in the practice of the invention without resort to undue experimentation. All art-known functional equivalents, of any such methods, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention.

THE EXAMPLES

The following reactions are conducted at ambient room temperature and ambient room pressure without heating the components unless otherwise indicated.

Example 1: Synthesis Using Absolute Ethanol

Oxalic acid dihydrate (1.148 g, 9.106 mmol) and 1,2,4-triazole (1.259 g, 18.23 mmol) were added to absolute ethanol (5 mL) while stirring vigorously to form a cloudy white suspension containing plates (0.1 to 1 cm) of undissolved triazole. The mixture was vigorously stirred until the flakes of the triazole were no longer observed in the suspension. To this suspension, solid basic zinc carbonate (1.998 g, 17.72 mmol Zn)([$ZnCO_3$]$_2$·[$Zn(OH)_2$]$_3$; ≥58 wt. % Zn basis) was added with slight effervescence. This mixture was allowed to stir at room temperature for 16 hours, then filtered, washed with water and ethanol (5-10 mL of each), and allowed to dry at room temperature in air on the filter paper to obtain 3.409 g of CALF-20. PXRD indicated a phase pure material (herein designated Exp-1-Product) which is compared to CALF-20 (Batch KD415) in FIG. 1. CALF-20 (Batch KD415) was prepared using an autoclave procedure as described in U.S. Pat. No. 9,782,745 which is incorporated by reference herein for a description of this procedure. Gas sorption performed as described in U.S. Pat. No. 9,782,745 by reference to Vaidhyanathan R. et al. (2009) Chem. Comm. 52305232, and as illustrated in FIG. 5 shows that Exp-1-Product has 93% of the $CO_2$ capacity at 273K of CALF-20 (batch KD415). We estimate that the error in adsorption measurement is about 1% and thus consider that the 7% difference is not entirely due to instrumental error. Differences in adsorption may be due to the presence of an impurity (a non-detectable amount of a crystalline impurity or an amorphous impurity that is not detectable by PXRD) or due to differences in crystallinity of the CALF-20 prepared. Material that has higher crystallinity will generally have narrower peaks as measured by PXRD.

MOF Exp-1-Product was found to have BET (Brunauer-Emmett-Teller) surface area of 530 $m^2/g$ as determined from the $CO_2$ sorption isotherms at 273K, as is known in the art. This compares to a measured BET surface area of 581 $m^2/g$ of a CALF materials prepared by the autoclave method of U.S. Pat. No. 9,782,745.

Example 2: Synthesis Using 50% by Volume Aqueous Ethanol

Figure 2:
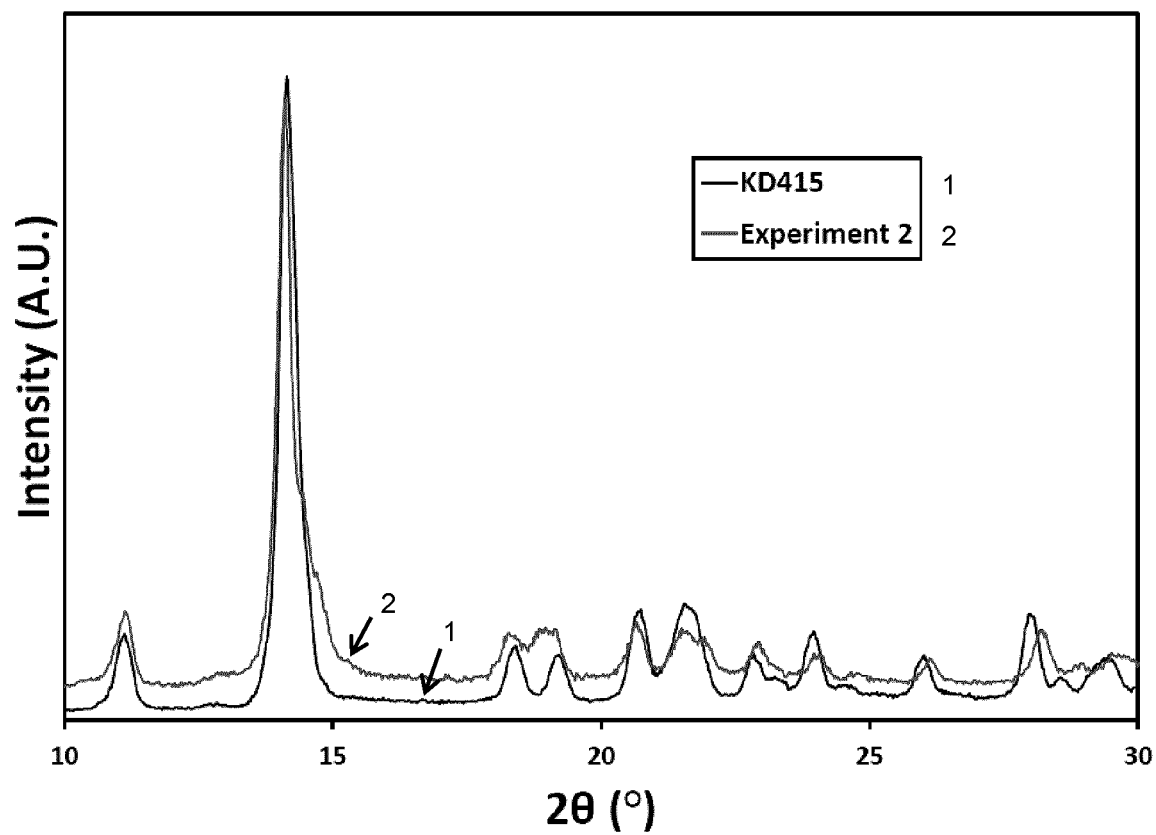
FIG. 2 compares the PXRD of KD415 to that of the material made as described in Example 2, FIG. 3 compares the PXRD of KD415 to that of the material made as described in Example 3.

Oxalic acid dihydrate (11.485 g, 91.015 mmol) was dissolved in absolute ethanol (40 mL). Separately, 1,2,4-triazole (12.584 g, 182.20 mmol) was dissolved in water (40 mL), The two solutions were then combined with stirring to form a cloudy white suspension of 1,2,4-triazolium oxalate. To this suspension, solid basic zinc carbonate (19.931 g, 176.81 mmol Zn) ($[ZnCO_3]_2 \cdot [Zn(OH)_2]_3$; ≥58 wt. % Zn basis) was added with slight effervescence. The resulting mixture was stirred at room temperature for 16 hours. The solid was filtered, washed sequentially with water and ethanol (5-10 mL each), and allowed to dry in air at room temperature on the filter paper to obtain 34.205 g of CALF-20 (Exp-2-Product). PXRD indicated a phase pure material (FIG. 2). Gas sorption shows in FIG. 6 that this Exp-2-Product has 95% of the $CO_2$ capacity at 273 K of CALF-20 (batch KD415).

MOF Exp-2-Product was found to have BET (Brunauer-Emmett-Teller) surface area of 544 $m^2/g$ as determined from the $CO_2$ sorption isotherms at 273K, as is known in the art.

Example 3: Synthesis Using 50% by Volume Aqueous Ethanol

Figure 3:
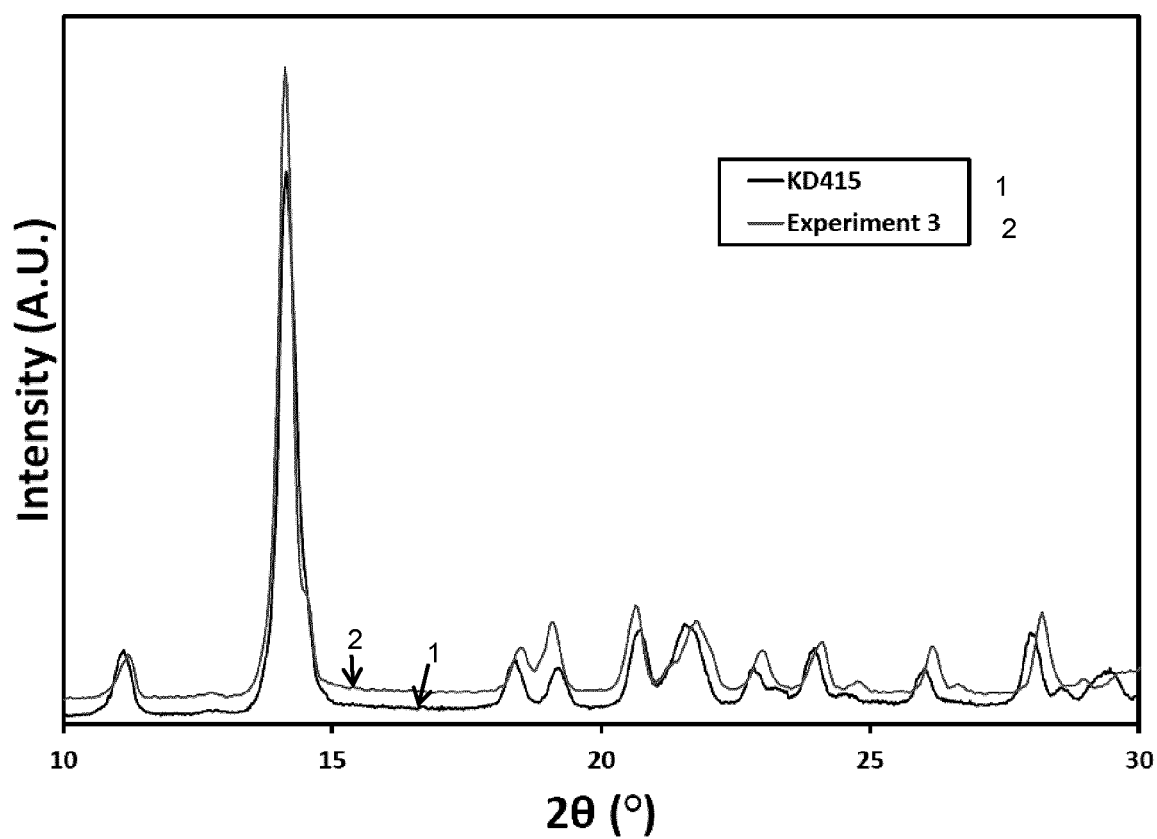

Oxalic acid dihydrate (365.227 g, 2.897 mol) was dissolved in absolute ethanol (800 mL). Separately, 1,2,4-triazole (401.341 g, 5.811 mol) was dissolved in water (800 mL), The two solutions were then combined with stirring to form a cloudy white suspension. To this suspension, solid basic zinc carbonate (633.501 g, 5.619 mmol Zn) ($[ZnCO_3]_2 \cdot [Zn(OH)_2]_3$; ≥58 wt. % Zn basis) was added with slight effervescence. This mixture was allowed to stir at room temperature for 22 hours. The solid was then filtered, washed sequentially with water and ethanol (5-10 mL), and allowed to dry in air at room temperature on the filter paper to obtain CALF-20 Exp-3-Product. PXRD (FIG. 3) indicates a phase pure material. Gas sorption (FIG. 7) shows Exp-3-Product has 105% of the $CO_2$ capacity at 273 K of CALF-20 (Batch KD415). The PXRD of Exp-3-Product appears to be more crystalline than KD415, as the peaks in the PXRD are noticeably narrower than those of KD415.

MOF Exp-3-Product was found to have BET (Brunauer-Emmett-Teller) surface area of 601 $m^2/g$ as determined from the $CO_2$ sorption isotherms at 273K, as is known in the art.

Example 4: Synthesis Using Aqueous Ethanol with Heating to 90° C.

Figure 4:
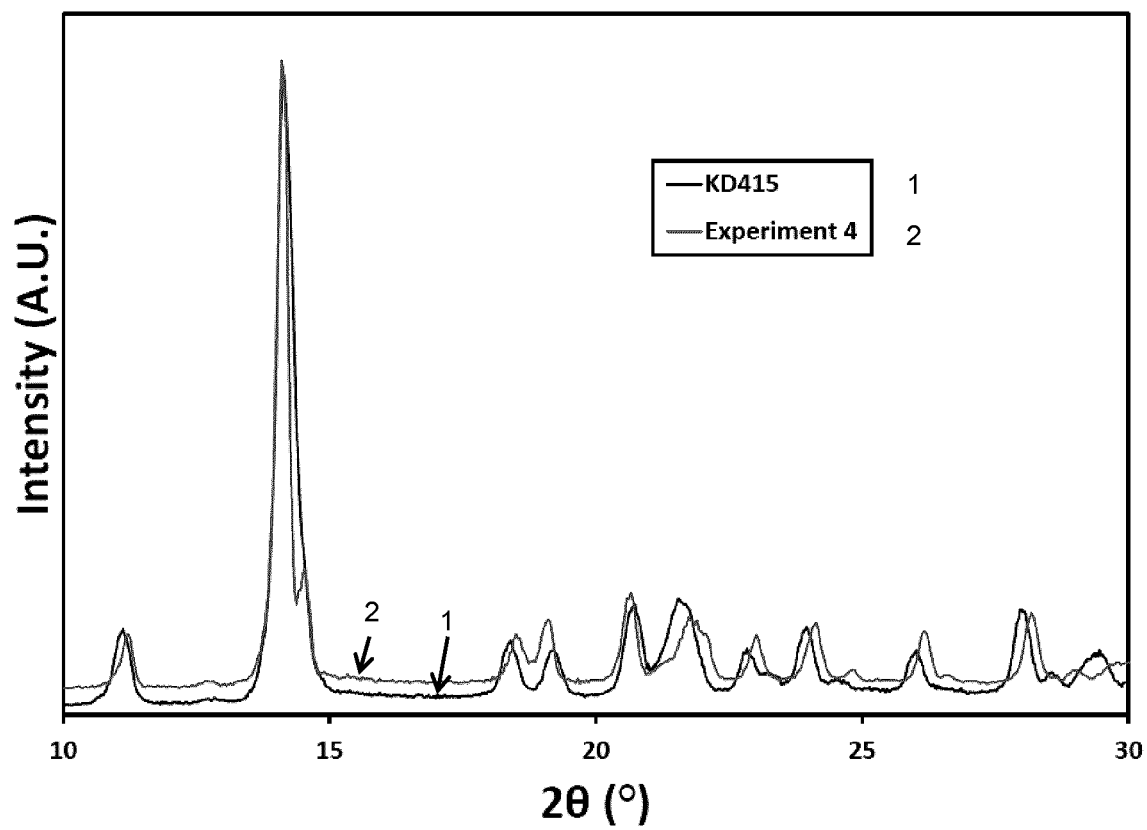
FIG. 4 compares the PXRD of KD415 to that of the material made as described in Example 4.

To a 125 mL Erlenmeyer flask, basic zinc carbonate (6.615 g, 58.15 mmol Zn) ($[ZnCO_3]_2 \cdot [Zn(OH)_2]_3$; ≥57.5 wt. % Zn basis) was added with 95% V/V aqueous ethanol (3 mL) to form a suspension. Separately, oxalic acid dihydrate (3.658 g, 29.02 mmol) was dissolved in absolute ethanol (15 mL) and 1,2,4-triazole (4.007 g, 58.02 mmol) was dissolved in water (15 mL). The two solutions were then combined with stirring to form a cloudy white suspension containing 1,2,4-triazolium oxalate. The two suspensions in aqueous ethanol were then warmed to 90° C. and the warmed 1,2,4-triazolium oxalate suspension was added to the Erlenmeyer flask containing the warmed basic zinc carbonate suspension, with immediate effervescence. This mixture was allowed to stir at 90° C. (with no condenser). Aliquots were removed and product solid filtered from solvent to quench the reaction every 2.5 min for the first 20 min. The samples were measured by PXRD which indicated that the reaction to CALF 20 was complete after 10 min, with the PXRD pattern remaining unchanged after that point. After 1 hour of stirring with no further heating the suspension was filtered to obtain the solid product. The solid was sequentially washed with water and ethanol (5-10 mL each), and left to dry in air at room temperature on the filter paper to give Exp-4-Product. PXRD of this product indicated phase pure CALF-20 (FIG. 4).

The synthetic methods herein can be employed to prepare Zn MOF materials containing a combination of 1,2,4-triazole with another N-heterocyclic compound, particularly with another cycloazocarbyl compound. Such Zn MOF materials containing a combination of 1,2,4-triazole and another N-heterocycle and prepared by the methods herein are useful as adsorbents and particularly as adsorbents for $CO_2$. Of particular interest, are those Zn MOF materials prepared by methods herein which contain a combination of 1,2,4-triazole with another N-heterocycle, wherein the molar ratio of 1,2,4-triazole to the other N-heterocycle is 4 or more. In specific embodiments, the molar ratio of 1,2,4-triazole to the other N-heterocycle is 5 or more. In specific embodiments, the molar ratio of 1,2,4-triazole to the other N-heterocycle is 10 or more. N-heterocycles useful in synthetic methods herein include imidazole, pyrazole, 1,2,3-triazole and tetrazole. N-heterocycles useful in the preparation of Zn MOF materials are commercially available or can be readily prepared using art-known methods.

The synthetic methods herein can be employed to prepare Zn MOF materials containing a combination of oxalic acid with another chelating ligand, such as squaric acid, or rubeanic acid. Such Zn MOF materials containing a combination of oxalic acid and another N-chelating ligand and prepared by the methods herein are useful as adsorbents and particularly as adsorbents for $CO_2$. Of particular interest, are those Zn MOF materials prepared by methods herein which contain a combination of oxalic acid with another chelating ligand, wherein the molar ratio of oxalic acid to the other N-heterocycle is 4 or more. In specific embodiments, the molar ratio of oxalic acid to the other N-heterocycle is 5 or more. In specific embodiments the molar ratio of oxalic acid to the other N-heterocycle is 10 or more. Chelating agents useful in the preparation of Zn MOF materials are commercially available or can be readily prepared using art-known methods. For example, squaric acid may be prepared for corresponding alkylesters.

We claim:

1. A method for making a Zn metal organic framework (MOF) of formula:

$Zn_2Ht_2CL$, where Ht is 1,2,4-triazole or a combination of 1,2,4-triazolate and one or more other cycloazocarbyl compound, and CL is oxalate or a combination of oxalate and one or more chelating ligand other than oxalate, which comprises the steps of:
(1) reacting 2 molar equivalents of 1,2,4-triazole or the combination of 1,2,4-triazolate and one or more other cycloazocarbyl compound with 1 molar equivalent of oxalate or a combination of oxalate and one or more chelating ligand other than oxalate to form a cycloazocarbyl chelating ligand compound as a suspension in solvent; and
(2) adding 2 molar equivalents of $Zn^{2+}$ to the suspension to form the Zn MOF.

2. The method of claim 1, wherein step (1) or step (1) and step (2) are conducted at a temperature less than or equal to 120° C.

3. The method of claim 1, wherein step (1) or step (1) and step (2) are conducted at a temperature less than or equal to 100° C.

4. The method of claim 1, wherein the method is conducted at atmospheric pressure.

5. The method of claim 1, wherein the solvent in step (1) is water, a lower alcohol or a miscible mixture of water and the lower alcohol.

6. The method of claim 1, wherein the solvent in step (1) is absolute ethanol.

7. The method of claim 1, wherein the solvent in step (1) is a mixture of water and ethanol.

8. The method of claim 1, wherein the solvent in step (1) is a 1:1 (by volume) mixture of water and ethanol.

9. The method of claim 1, wherein $Zn^{2+}$ is added to the suspension as a solid basic Zn salt.

10. The method of claim 1, wherein $Zn^{2+}$ is added to the suspension as a suspension or solution of a Zn salt in water, a lower alcohol or a mixture thereof.

11. The method of claim 1, wherein Ht is 1,2,4-triazole and CL is oxalate.

12. The method of claim 1, wherein the cycloazocarbyl chelating ligand compound is 1,2,4-triazolium oxalate.

13. The method of claim 1, wherein CL is a mixture of oxalate and squarate.

14. The method of claim 1, wherein CL is a mixture of oxalate and rubeanate.

15. The method of claim 1, wherein Ht is a combination of 1,2,4-triazolate and one or more other cycloazocarbyl compound, which is a 5- or 6-member ring cycloazocarbyl compound that is at least bidentate and wherein the ring contains 2, 3 or 4 nitrogens and the ring is optionally substituted with a non-hydrogen substituent selected from —$NH_2$, C1-C3 alkyl amino, C1-C3 dialkyamino, C1-C3 alkyl, C2-C3 alkenyl, or C2-C3 alkynyl.

16. The method of claim 1, wherein Ht is a combination of 1,2,4-triazolate and one or more of imidazolate, 1,2,3-triazolate, pyrazolate, or tetrazolate.

17. The method of claim 1, which is conducted at room temperature and atmospheric pressure.

18. The method of claim 1, which is conducted at 90° C. and atmospheric pressure.

19. The method of claim 1, wherein the solvent in step (1) is water.

20. The method of claim 1, wherein $Zn^{2+}$ is added to the suspension as solid basic Zn carbonate or as a suspension or solution of basic Zn carbonate in water, a lower alcohol or a mixture thereof.

* * * * *